May 23, 1939.   H. W. DOENNECKE ET AL   2,159,759
APPARATUS FOR RECOVERING ANHYDROUS SODIUM SULPHATE AND THE LIKE
Original Filed Aug. 31, 1935
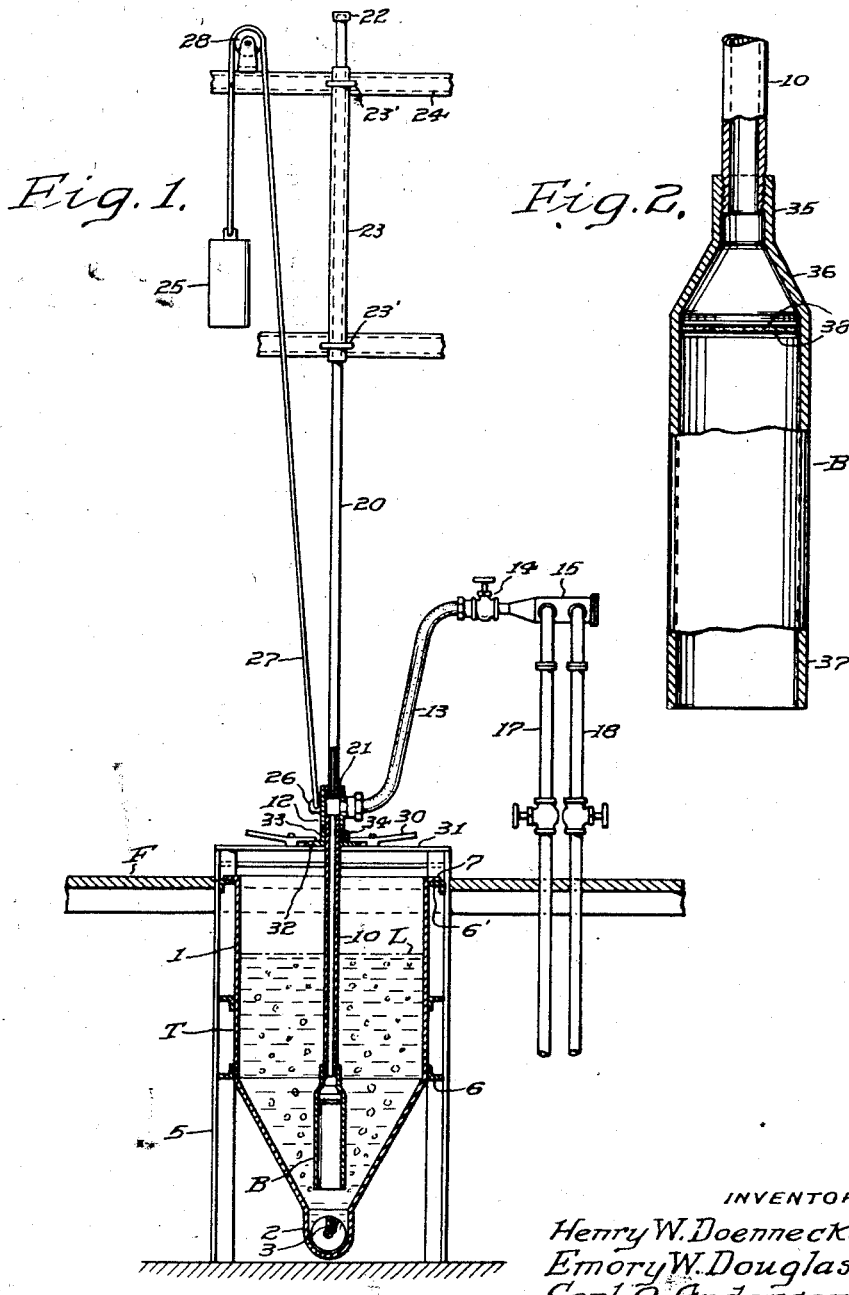
INVENTORS
Henry W. Doennecke,
Emory W. Douglass,
Carl O. Anderson.
BY
ATTORNEY Patented May 23, 1939

2,159,759

UNITED STATES PATENT OFFICE 2,159,759

APPARATUS FOR RECOVERING ANHYDROUS SODIUM SULPHATE AND THE LIKE

Henry W. Doennecke and Emory W. Douglass, Tulsa, Okla., and Carl O. Anderson, Baxter Springs, Kans., assignors to Ozark Chemical Company, Tulsa, Okla., a corporation of Delaware Original application August 31, 1935, Serial No. 38,714. Divided and this application May 7, 1937, Serial No. 141,340

2 Claims. (Cl. 126—360)

This invention is directed to apparatus particularly adapted for recovering anhydrous sodium sulphate in accordance with the method disclosed and claimed in United States Letters Patent 2,086,902, issued to us July 13, 1937, of which this application is a division, said apparatus, however, being equally well adapted for use in the recovery of substances other than sodium sulphate and particularly those which, similarly thereto, have the characteristic of "inverse" solubility above a certain temperature. To enable those skilled in the art to comprehend and practise the present invention we shall therefore herein by way of example refer more particularly to its use in the recovery of anhydrous sodium sulphate pursuant to our said method but not by way of restriction or limitation of its use therein or thereto.

Anhydrous sodium sulphate shall be considered as including any physical form of the solid salt, sodium sulphate, which does not contain any combined water of crystallization. It shall also be understood that this salt may be of any degree of purity insofar as the sodium sulphate content is concerned, and that our apparatus may be utilized in the commercial recovery of anhydrous sodium sulphate from water solutions containing only sodium sulphate or containing sodium sulphate and other constituents or from "slurry" consisting of a fluid mass having crystals and/or particles of the hydrous Glauber's salt $Na_2SO_4.10H_2O$ and of the anhydrous sodium sulphate in suspension therein.

The recovery of anhydrous sodium sulphate and like substances of "inverse" solubility from natural brine or other fluids by direct processes of various types has heretofore been suggested but as far as we are aware none of these is commercially practicable for the reasons, among others, that even when relatively concentrated solutions are available, their tendency to deposit scale on the walls and other parts of any apparatus in which they are heated inhibits satisfactory recovery of the anhydrous salt or other substance on a commercial basis. Moreover, such scale adheres tenaciously to the walls of the concentrating apparatus through which heat exchange is effected and in such quantities as to rapidly impair the efficiency of the apparatus and substantially prevent its continuous operation by necessitating frequent shutdowns for the removal of the scale.

Our apparatus is therefore particularly useful in the commercial recovery of anhydrous sodium sulphate by removal of water from a fluid or semi-fluid mass comprising water containing sodium sulphate in relatively high concentration and thus either wholly or only partially dissolved therein, and we may therefore utilize as materials from which the anhydrous salt is to be extracted either crystals of the hydrous salt, which melt at a relatively low temperature with a portion of the contained sodium sulphate dissolving in the released water of crystallization, or slurry containing such crystals or crystals of anhydrous sodium sulphate in suspension in a saturated solution of the salt, or solutions, saturated or unsaturated, wherein the quantity relationships of the contained constituents are such as to permit precipitation of sodium sulphate by evaporation alone. These materials are obtainable readily from certain natural brines or other sources; for example, the hydrous salt $Na_2SO_4.10H_2O$ may be recovered with the aid of the method for the recovery of crystalline Glauber's salt disclosed in United States Letters Patent 2,007,956, issued July 16, 1935, to Sidney H. Davis, Carl O. Anderson and Rudolph Stengl.

An object of our invention, therefore, is the provision of apparatus adapted for the continuous heating and agitation of the fluid from which sodium sulphate or other material is to be extracted and evaporation of contained water therefrom without adherence or caking of the solid on the walls and/or other portions of apparatus contacted by the fluid.

A further object is the provision of an improved mechanism for the combustion of gas and air beneath the surface of a fluid whereby direct heating of a salt bearing solution may be effected and its contained water rapidly and economically evaporated with resultant commercial recovery of the material dissolved therein.

A still further object of the invention is the provision of a novel burner adapted for the submerged combustion of fuel beneath the surface of a fluid and substantially out of contact therewith.

Other objects, purposes and advantages of the invention will hereinafter more fully appear or will be understood from the following description of apparatus constructed in accordance therewith of which a preferred embodiment is shown in the accompanying drawing.

In said drawing, Fig. 1 is a somewhat diagrammatic side elevation of said apparatus partially in vertical section, and Fig. 2 is an enlarged detail of an improved burner constructed in accordance with the invention.

The same characters are used to designate the same parts in both figures.

The apparatus may comprise a tank T desirably made of Monel metal or other relatively non-corrosive substance and desirably provided with a smooth interior finish; its side walls 1 preferably converge near the bottom into an elongated relatively narrow U-shaped trough 2 within which is disposed a screw conveyor 3 of a usual type operated by any convenient means (not shown) and adapted for conveying to a suitable point in the trough for removal the solids precipitated from the solution. These precipitated solids, gathered together at such point by the conveyor, are in the form of relatively small particles and may thus be removed with the aid of any suitable apparatus no specific description or illustration of which is required.

The tank is conveniently supported to extend below the floor level F from suitable legs 5 of a frame comprising also horizontal retaining bars 6, and the upper edges of the tank are outwardly flanged at 7 to rest upon the uppermost set 6' of these bars.

The tank may be of any desired form, preferably an elongated oval in horizontal section, and of any convenient length; for example its length, measured parallel to the conveyor axis, may be about twice its width, measured transversely thereof, and with such a tank we may utilize one or more of our novel burners. Thus, with a tank T as shown in Fig. 1, we provide the submersible burner B, hereafter more fully described, which is desirably disposed at about the center of the tank; if more than one burner is provided they will preferably be positioned at suitable intervals in its longitudinal central plane. The burner B is provided with any suitable fuel and air mixture through a vertically movable supporting pipe 10, the upper end of which is received in one branch of a T-fitting 12; a flexible conduit 13 leads from the latter to a valve 14 interconnected with the outlet port of a mixing chamber 15. A valve controlled air supply pipe 17 and a similarly controlled gas supply pipe 18 are connected into the mixing chamber 15 so that by manipulation of the several valves a combustible mixture of fuel and air may be fed to the burner and the proportion of fuel to air as well as the quantity of the mixture delivered readily regulated in accordance with desired operating conditions.

The T-fitting 12 from which the burner is suspended also supports a slide rod 20 which extends upwardly therefrom. This rod may consist of a small pipe attached to the fitting through the medium of a sleeve 21, and the upper end of the pipe is closed by a cap 22 to prevent escape of fuel. The rod 20 is vertically slidable in a sleeve 23 supported by brackets 23' from horizontal bars 24 or any other convenient supporting means positioned above the tank and thereby permits vertical movement of the burner relatively to the tank when and as desired.

A counterweight 25 is preferably connected to a lug 26 on the T-fitting 12 through the medium of a flexible cord or chain 27 running over a sheave 28 to substantially counterbalance or slightly overbalance the burner, guide rod and parts rigidly connected thereto to facilitate raising the burner from the tank and lowering it thereinto, and to releasably hold it in lowered position we provide movable latches 30 carried by a cross bar 31 on top of the tank and adapted to engage the flange 32 of a collar 33 adjustably secured to the burner supply pipe 10 by means of a set screw 34.

The burner B which may desirably be formed principally of steel or any other suitable metal, comprises a cylindrical tube 35 threaded to supply pipe 10 and serving as an inlet port and to support other portions of the burner therefrom. An outwardly flaring conical portion 36 is welded or otherwise permanently united to tube 35, and a larger cylindrical tube 37 forming the burner combustion chamber is similarly united with the outer edge of the conical portion 36. Within the chamber just below the junction of these parts a pair of wire screens may be secured by soldering, brazing or the like, the screens being slightly spaced apart and of sufficiently fine mesh to serve as flame guards against propagation of flame in the conical portion 36 or supply pipe 10 when the combustible mixture fed to the burner through the latter is burned in the combustion chamber 37.

In the performance of the method disclosed and claimed in our said Letters Patent with the aid of the apparatus just described, latches 30 are released and the burner is raised from the tank sufficiently for the lower end of its combustion chamber to clear the level L of the fluid and preferably to clear the floor level F. The several control valves are next operated to supply a mixture of fuel and air in suitable proportions and quantities and the burner is then lighted. Upon thereafter being lowered into the fluid, the pressure of the gas and air mixture in the burner is sufficient to overcome the opposing pressure of the fluid in the tank, so that as the burner is submerged the products of combustion escape from its lower end and rise through the fluid, causing violent agitation thereof.

By the provision of a combustion chamber of uniform diameter throughout and thus devoid of any restriction or narrowing at the point of egress from the burner of combustion products, we obtain highly efficient heating of the fluid and larger burner capacity than is the case in submerged burners having restricted outlets for the combustion products. Thus, a burner having a combustion chamber 6 inches in diameter has been operated at an hourly consumption of 900 cu. ft. of natural gas with which sufficient air was premixed to insure complete combustion, with consequent release of heat at the rate of approximately 900,000 B. t. u. per hour. It will be understood, however, the maximum limit of the capacity of a burner of this size may be considerably higher with efficient and economical release of heat at a more rapid rate, the results obtained during one period of normal operation having herein been cited for purposes of example only.

In our burner the total absence of restriction in the combustion chamber, particularly at its lower or outlet end, also causes the escaping combustion products to effect extremely active agitation of the fluid in which the burner is submerged which assists in minimizing incrustation of the exterior surfaces of the burner by scale deposited from the fluid.

As a general rule we prefer to construct the burner in such manner that the ratio of the length to the inner diameter of the combustion chamber is approximately 5:1, and when approximately this ratio is observed certain other advantages are realized which are not obtainable to a like extent in similar burners the corresponding dimensions of which depart materially from this ratio. Thus, as is well known, initial introduction of a lighted submersible burner into a fluid sets up violent agitation of the fluid and causes considerable bumping or churning therein, but with our burner this action is of but short duration, after which the action of the fluid changes to a fairly uniform but still vigorous ebullition due to the buoyancy of the products of combustion which are substantially uniformly and regularly discharged into it from the combustion chamber outlet of the burner and at a substantially uniform pressure.

The walls of the combustion chamber, which are composed entirely of steel or other suitable metal, form a confining yet heat conductive envelop for the gases within which substantially all combustion takes place and are thus maintained in close proximity to an area of intense heat extending from the outlet end of the chamber almost to its inlet end and when this area is of considerable length, as in a burner having the dimension ratio just mentioned, complete combustion of the gas, even when introduced to the burner at high velocity and in large volume, may be readily obtained, without, however, material impairment of heat transfer to the fluid either through sudden rapid expansion of the gaseous combustion products or material delay in effecting their contact with the fluid after completion of combustion in or just below the end of the burner.

Some reference has been made to the pressure of the combustible mixture supplied to the burner and to its depth of submersion and it will be understood that these factors may be regulated in accordance with preference and may require some modification under various specific operating conditions. However, certain general principles may desirably be observed in relation thereto, for example, higher fuel and air pressures up to perhaps 20 lbs. gauge are usually to be preferred when relatively small burners are employed, since such pressures effectively minimize the deposition of scale on the exterior of the burner and maintain active agitation of the solution. With larger burners, however, these pressures may be reduced to points just sufficient to insure maintenance of continuous combustion in the burner and escape of its products therefrom at the depth of submergence desired, and with this qualification, changes in the latter depth within reasonable limits appear to have but relatively slight effect upon the operating efficiency of the burner, although we prefer to operate the 6-inch burner herein described with its outlet end submerged to a depth of approximately 3½ ft. below the level of the fluid in the tank.

In the operation of the burner in the manner herein mentioned, transfer of heat to the fluid is effected by transmission through the burner wall and also directly by contact of the products of combustion and a high degree of efficiency is thereby obtained with the result that contained water is rapidly evaporated and, when the fluid is a slurry or solution of Glauber's salt, anhydrous sodium sulphate is precipitated to the bottom of the tank for removal therefrom. Moreover, the continuous relatively violent agitation of the fluid causes the particles of the precipitate to grow to appreciable size before their ultimate deposition at the bottom of the tank whereby handling and/or other operations into which they subsequently enter are facilitated, and by regulation of the degree of agitation by means of the burner controlling valves and by adjustment of the depth of submergence, the size of the particles may be subjected to limited control.

At the initiation of the dehydration process, the tank T is supplied to the desired level with Glauber's salt, slurry or other material from which dehydrated salt is to be extracted. The burner, maintained in elevated position and thus out of contact with the fluid, is then lighted and its control valves manipulated so as to supply it with desired quantities of a suitable mixture of fuel and air, and the lighted burner is then slowly lowered into the fluid. When it has reached the proper depth in the tank, corresponding to that for which flanged collar 33 has previously been set on supply pipe 10, the burner and its associated mechanism are locked in position by manipulation of the latches and thereafter continue to operate for any desired period. The screw conveyor in the bottom of the tank may then be set in motion to carry the precipitated material to a convenient point for removal from the tank and upon its removal and drying in any convenient way it is ready for use.

In the course of the operation of the burner the products of combustion and water vapor are given off in considerable quantities and may be removed from the vicinity of the apparatus by means of a suitable shield and conduit or other ventilating apparatus (not shown). The reduction of the water content of the fluid in the tank together with the extraction and removal of the precipitate, usually carrying with it small quantities of the solution, causes substantially continuous material depletion of the total volume of fluid in the tank, and to maintain this volume substantially constant for continuous operation the solution carried with the removed material may be recovered therefrom as by centrifuging and returned to the tank along with fresh solution, slurry or the like, which may be supplied either continuously or intermittently as desired. Substantially continuous extraction may thus be maintained for relatively long periods without the usual caking and/or clogging occurring from time to time in apparatus heretofore constructed and operated in accordance with known methods, and interruption of the operation of our apparatus for such causes is therefore substantially unnecessary. Moreover, the walls of our fluid tank are heated only indirectly by contact of the heated solution therewith and are not, as in apparatus heretofore known, heated to a temperature greater than that of the solution and this, together with the violent agitation of the solution which may readily be maintained in the tank when our burner is employed and operated as herein described prevents adherence of precipitated solids to the tank walls, burner and associated parts.

While we have herein described our invention with considerable particularity, referring more especially to its use in evaporation recovery of anhydrous sodium sulphate in a commercial way in accordance with the method of our said Letters Patent 2,086,902, it will be understood our apparatus is eminently suitable for performance of other methods involving submerged combustion and that changes and modifications in the form, construction and arrangement of the several parts will readily occur to those skilled in the art and may be made if desired without departing from the spirit and scope of the invention as defined in the appended claims.

Having thus described our invention, we claim and desire to protect by Letters Patent of the United States:

1. A burner for the submerged combustion of fuel beneath the surface of fluid and substantially out of contact therewith comprising a hollow approximately cylindrical metal tube of interiorly unobstructed uniform cross sectional area from end to end forming a downwardly directed combustion chamber for confining the products of combustion and having the sole outlet therefor at its lower end of like cross sectional area, a hollow metal portion forming a frusto-conical expansion chamber having its lower end co-extensive and integrally united with the upper end of said tube, and means secured to the upper end of said portion for introducing axially into the expansion chamber a combustible mixture of fuel and air under pressure in a downwardly directed stream and for supporting said portion and tube beneath the surface of the fluid in heat exchange relation therewith.

2. A burner for the submerged combustion of fuel beneath the surface of fluid and substantially out of contact therewith comprising a hollow approximately cylindrical tube formed of heat conductive material defining a combustion chamber and adapted to conduct heat derived from the combustion of gaseous fuel therein to the surrounding fluid by contact of its exterior surface therewith, said tube having an unobstructed opening at its lower end transversely co-extensive with said combustion chamber and forming the sole outlet for passage of combustion products from said chamber into the fluid, means integral with the upper end of said tube providing a frusto-conical expansion chamber having a downwardly divergent boundary transversely co-extensive with said combustion chamber at its lower end, and means for introducing into said expansion chamber a downwardly directed stream of fuel and air in combustible mixture.

HENRY W. DOENNECKE.
EMORY W. DOUGLASS.
CARL O. ANDERSON.